(No Model.)

J. A. HOGG & W. HALL.
HAY STACK BINDER.

No. 260,023. Patented June 27, 1882.

Witnesses:
A. L. Pierce.
F. W. Heers

Inventors:
John A. Hogg and William Hall,
By Thomas G. Orwig, Attorney.

UNITED STATES PATENT OFFICE.

JOHN A. HOGG AND WILLIAM HALL, OF SHELTON, NEBRASKA.

HAY-STACK BINDER.

SPECIFICATION forming part of Letters Patent No. 260,023, dated June 27, 1882.

Application filed February 6, 1882. (No model.)

*To all whom it may concern:*

Be it known that we, JOHN A. HOGG and WILLIAM HALL, of Shelton, in the county of Buffalo and State of Nebraska, have invented a Hay-Stack Binder, of which the following is a specification.

Heretofore flexible coverings have been fixed to folding frames to adapt them to be fastened over hay cocks and stacks to protect the hay from rain; but the hay cocks and stacks must be shaped to conform with the various shapes of such coverings before they can be advantageously applied to protect the hay.

The object of our invention is to prevent hay in bulk, when on wagons and in stacks, from being scattered and destroyed and lost through the force of winds, storms, and gales, as frequently occurs.

Our invention consists in forming a flexible hay-binding device of links, rings, and pins or pickets, as hereinafter fully set forth, in such manner that it can be compactly folded for packing and shipping and readily distended and spread over a wagon-load of hay, hay-cock, or stack of hay of any size or shape, and fastened to bind the hay together, so as to prevent the mass from settling to one side and falling off or over or separating when subjected to the action of the wind.

Figure 1:
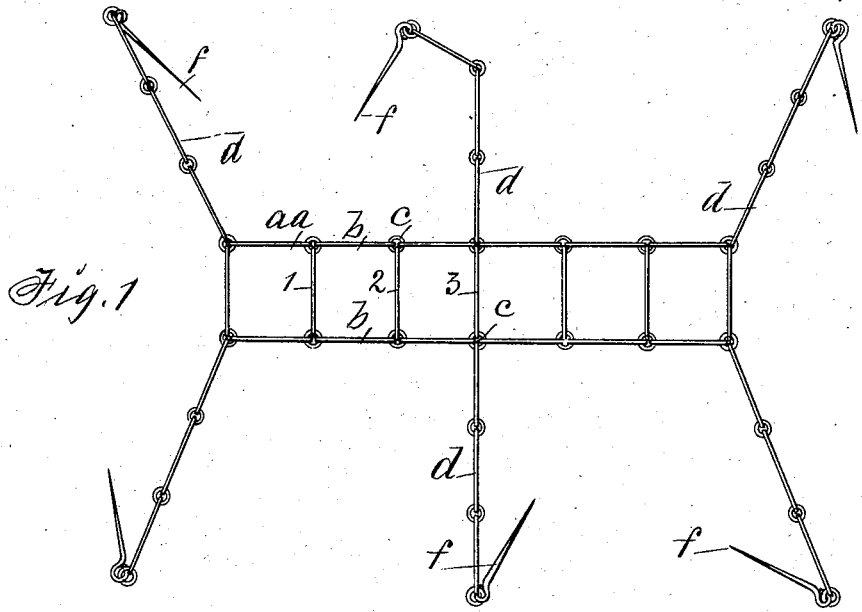
Figure 2:
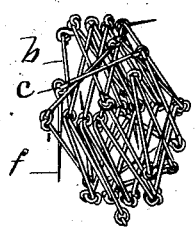
Figure 3:
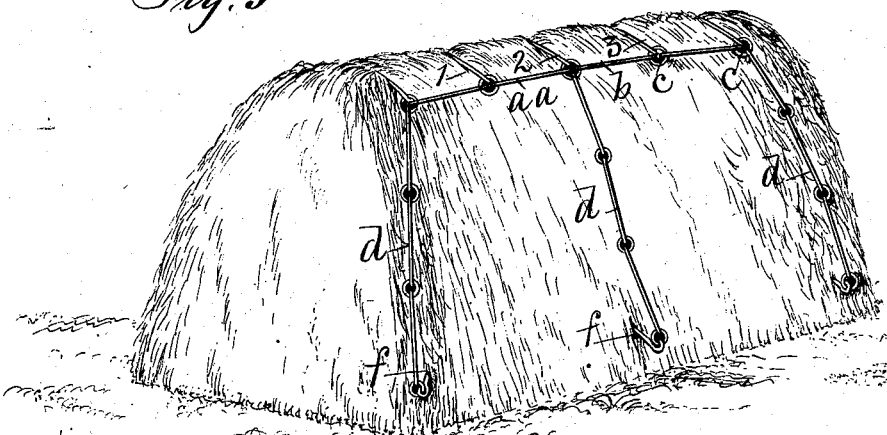

Figure 1 of our accompanying drawings shows our device extended upon a flat surface. Fig. 2 shows it folded together, as required to economize space in storing, packing, and shipping. Fig. 3 shows it in position on a hay-stack. Jointly considered these figures clearly illustrate the construction, application, and operation of our complete invention.

$a\ a$ represent a continuous chain, preferably formed of a series of straight metal bars or links, $b$, that are flexibly connected by hinging their ends to rings $c$, or in any suitable way, in such a manner that when the chain is distended it will form a quadrilateral figure, as shown in Fig. 1.

The length of the links may vary, as desired, and the number of links and size and weight of this central portion of our complete device may also vary.

Numbers 1 2 3 represent a series of cross-bars or chains flexibly connected with the parallel sides of the central portion, $a\ a$, to produce a net adapted to spread over loose hay.

$d\ d$ represent chains, preferably composed of bars in the manner in which the continuous chain $a\ a$ is made, flexibly connected with the corners and sides of the quadrilateral figure, net, and central portion of our device.

$f\ f$ are pins or pickets flexibly connected with the free ends of the chains $d$.

In the practical operation of our hay-binder thus constructed we simply unfold it and spread it over the top of a load of hay on a wagon or a stack of hay on the ground, and then seize the pins or pickets depending from the ends of the chains $d$ and force their free and pointed ends horizontally into the sides of the load or stack, as shown in Fig. 3, and when all the pins $f$ and chains $d$ are thus fastened the complete device will bind the load or stack and prevent the wind from scattering, damaging, or carrying off any part thereof.

We claim as our invention—

The improved hay-stack binder, which consists of a flexible frame, $a\ b\ c$, composed of links and rings, and having a series of flexible transverse parts, 1 2 3, to produce a net, and a series of flexible branches, $d$, having pickets $f$ at their ends, substantially as shown and described, to operate in the manner set forth when in use and adapted to be folded compactly when not in use, for the purposes specified.

JOHN A. HOGG.
WILLIAM HALL.

Witnesses:
H. S. COLBY,
M. L. PHELPS.